United States Patent
Cahill et al.

(10) Patent No.: US 9,714,019 B2
(45) Date of Patent: Jul. 25, 2017

(54) AIRCRAFT BRAKE SYSTEM TESTING METHODS

(71) Applicant: Goodrich Corporation, Charlotte, NC (US)

(72) Inventors: Eric Cahill, Troy, OH (US); Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 41 days.

(21) Appl. No.: 14/929,031

(22) Filed: Oct. 30, 2015

(65) Prior Publication Data

US 2016/0052502 A1 Feb. 25, 2016

Related U.S. Application Data

(62) Division of application No. 14/290,521, filed on May 29, 2014, now Pat. No. 9,227,617.

(51) Int. Cl.
| | |
|---|---|
| *B60T 8/88* | (2006.01) |
| *B64C 25/44* | (2006.01) |
| *B60T 17/22* | (2006.01) |
| *B64C 25/42* | (2006.01) |
| *B60T 8/17* | (2006.01) |

(52) U.S. Cl.
CPC .......... *B60T 17/221* (2013.01); *B60T 8/1703* (2013.01); *B60T 8/885* (2013.01); *B64C 25/42* (2013.01); *B64C 25/44* (2013.01); *B60T 2270/406* (2013.01)

(58) Field of Classification Search
None
See application file for complete search history.

(56) References Cited

U.S. PATENT DOCUMENTS

| | | |
|---|---|---|
| 8,177,308 B2 | 5/2012 | Ralea |
| 2005/0082999 A1 | 4/2005 | Ether |
| 2006/0108867 A1 | 5/2006 | Ralea |
| 2010/0292889 A1 | 11/2010 | Cahill |

(Continued)

FOREIGN PATENT DOCUMENTS

| | | |
|---|---|---|
| EP | 2565093 | 3/2013 |
| EP | 2719596 | 4/2014 |

(Continued)

OTHER PUBLICATIONS

USPTO; Pre-Interview Communication dated Sep. 1, 2015 in U.S. Appl. No. 14/290,521.

(Continued)

*Primary Examiner* — Mussa A Shaawat
*Assistant Examiner* — Abdhesh Jha
(74) *Attorney, Agent, or Firm* — Snell & Wilmer L.L.P.

(57) ABSTRACT

Methods for testing the operation of an aircraft braking system utilize the steps of applying a predetermined electrical energy level to an electromechanical actuator attached to a brake assembly, followed by discontinuing electrical energy to the electromechanical actuator. In some test methods, an actuation level of the electromechanical actuator is determined and used to evaluate braking performance. In other tests, a voltage generated by an electric motor in an actuator is measured and used to evaluate braking performance.

6 Claims, 3 Drawing Sheets

(56) References Cited

U.S. PATENT DOCUMENTS

2013/0060404 A1   3/2013  Cahill
2014/0257713 A1*  9/2014  Kreienheder ............. B60T 1/16
                                                       702/33

FOREIGN PATENT DOCUMENTS

GB      2470099    11/2010
GB      2470251    11/2010

OTHER PUBLICATIONS

USPTO; Notice of Allowance dated Oct. 7, 2015 in U.S. Appl. No. 14/290,521.
EPO; Extended Search Report dated Oct. 19, 2015 in European App. No. 15168145.9.

* cited by examiner

AIRCRAFT BRAKE SYSTEM TESTING METHODS

CROSS REFERENCE TO RELATED APPLICATIONS

This application is a Divisional Application of and claims priority to, U.S. Ser. No. 14/290,521, entitled "AIRCRAFT BRAKE SYSTEM TESTING METHODS," filed May 29, 2014, which is hereby incorporated by reference in its entirety.

FIELD

The present disclosure relates to aircraft wheel and brake assemblies, and more specifically, to testing of aircraft braking systems.

BACKGROUND

Aircraft typically utilize landing gear including one or more wheel assemblies. These wheel assemblies include braking systems which apply braking force to the wheels to assist in decelerating and/or steering the plane during landing or rejected take off (RTO) events. Failure of such braking systems may result in accidents, including runway excursions and collisions with objects, including ground equipment and other aircraft. Undesired and/or uncommanded braking may also result in other aircraft malfunctions.

SUMMARY

A method for testing the operation of an aircraft braking system comprises at least partially actuating a brake actuator attached to a brake assembly comprising a brake stack, discontinuing actuation to the brake actuator, determining the actuation level of the brake actuator, and evaluating braking performance. The brake assembly may comprise one or more electromechanical actuators. Determining the actuation level of the brake actuator comprises receiving a signal from a position detector of the brake actuator. Evaluating braking performance may comprise comparing the actuation level of the brake actuator to a predetermined value. In various embodiments, the difference between the actuation level and a predetermined level may be between about 0.05 inches and 0.2 inches (between about 1 millimeter and 20 millimeters).

Another method for testing the operation of an aircraft braking system comprises applying a predetermined electrical energy level to an electromechanical actuator attached to a brake assembly comprising a brake stack, discontinuing electrical energy to the electromechanical actuator, measuring the electrical voltage from a motor of the electromechanical actuator, and evaluating braking performance. The brake assembly may comprise four electromechanical actuators. Evaluating braking performance may comprise comparing the voltage produced by the motor to a predetermined value. In various embodiments, the difference between the voltage produced by the motor and the predetermined value may be between about 1 volt and 600 volts.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

Although electrical energy is referenced throughout the disclosure and exemplary embodiments, electrical energy is just one exemplary type of electrical parameter such as voltage, current, power, etc. that represents measurable electrical values or phenomena that characterize the behavior of electronic circuits, components, or semiconductors. Any electrical parameter may be substituted in place of electrical energy as would be understood by one of ordinary skill in the applicable art.

Figure 1:
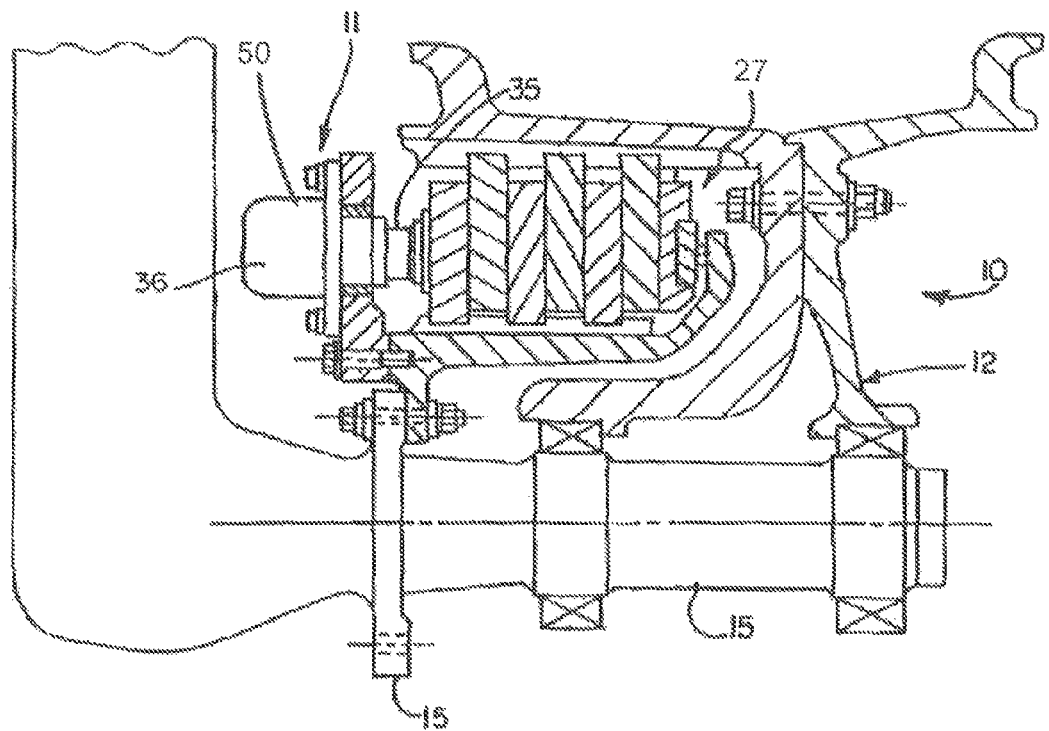
FIG. 1 illustrates a portion of a brake system of the prior art.

With reference to FIG. 1, a portion of a wheel and brake system 10 is illustrated.

Wheel and brake system 10 may comprise, for example, a brake assembly 11. In various embodiments, brake assembly 11 may be coupled to an axle 15 of a wheel 12. For example, brake assembly 11 may exert force against one or more components of wheel 12 to reduce the speed of an aircraft.

In various embodiments, brake assembly 11 may comprise a brake stack 27. For example, brake stack 27 may comprise components that interface with both wheel 12 and brake assembly 11. Further, in various embodiments, brake stack 27 may be configured such that when force is applied, brake stack 27 acts to apply force to wheel 12 and reduce the speed of the aircraft.

Brake assembly 11 may further comprise, for example, one or more brake actuators 36. For example, brake actuators 36 may be configured such that in response to an operator activating a control (e.g., depresses a brake pedal), brake actuators 36 laterally compress brake stack 27 which, in turn, resist rotation of wheel 12 and thus reduces the speed of the aircraft.

Brake actuator 36 may comprise, for example, an electromechanical brake actuator. In various embodiments, a predetermined level of electrical energy may be applied to an electromechanical actuator such as brake actuator 36, resulting in a predetermined actuation level. In other embodiments, brake actuator 36 may comprise a hydraulic actuator. Hydraulic actuator 36 may, for example, be actuated by applying hydraulic presser to brake actuator 36. In further embodiments, brake actuator 36 may comprise a hybrid electromechanical-hydraulic actuator. Any type of actuator is within the scope of the present invention.

In various embodiments, brake actuator 36 may comprise a ram 35. For example, actuation of brake actuator 36, which may cause ram 35 to change position and extend laterally. In various embodiments, ram 35 may extend towards and apply force to brake stack 27, compressing the stack and reducing the speed of the aircraft.

Brake actuator 36 may comprise, for example, an electric motor 50. In various embodiments, electric motor 50 is coupled to ram 35 such that applying electrical energy to the motor causes ram 35 to extend towards and apply force to brake stack 27. For example, rotation from electric motor 50 may be translated to ram 35 by gearing, including various ball screws and/or screw gears. Any manner of translating rotation from electric motor 50 to linear motion of ram 35 is within the scope of the present disclosure. For example, a hydraulic brake actuator 36 may convert hydraulic pressure applied to the actuator to linear or angular force to ram 35.

In various embodiments, in response actuation being discontinued to brake actuator 36, ram 35 may be retracted linearly away from brake stack 27. For example, brake stack 27 may comprise a configuration that exerts a restorative force against ram 35, such that ram 35 is pushed back and away from brake stack 27 when actuation is discontinued. In various embodiments, discontinuing actuation may comprise discontinuing the application of electrical energy, hydraulic pressure, or any combination of both to brake actuator 36.

Components of brake actuator 36 may fail such that brake stack 27 is at least partially engaged when no electrical energy is being applied to brake actuator 36. For example, after electrical energy is applied and discontinued, ram 35 may remain in an extended position. Stated another way, ram 35 may "stick" such that it continues to provide force to brake stack 27 after electrical energy is discontinued. This scenario may cause unwanted and/or uncommanded braking.

Figure 2:
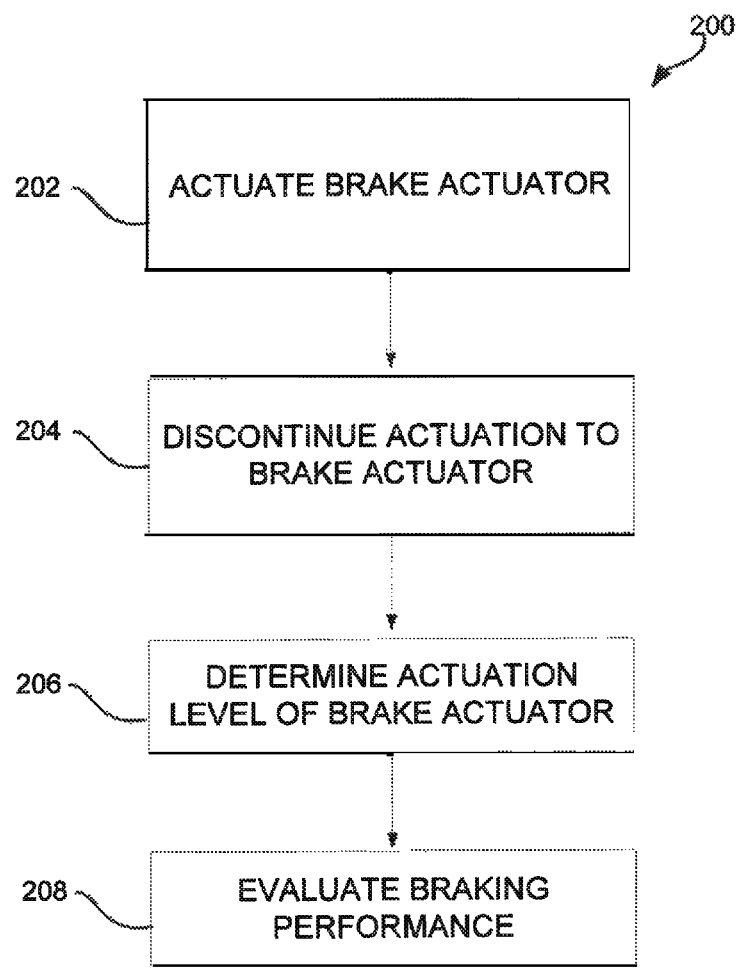
FIG. 2 illustrates a brake system testing method in accordance with various embodiments.

With reference to FIG. 2, a brake system test method 200 is illustrated. In various embodiments, brake system test method 200 may be employed to determine if one or more brake actuators 36 are operating within predetermined operating parameters and therefore are less likely to cause undesired braking. For example, brake system test method 200 may be applied to an aircraft that is in flight, in an effort to detect the potential failure of one or more brake actuators 36 before landing. In other embodiments, test method 200 may be applied to the aircraft during taxiing, parking, or any other phase of operation of the aircraft.

In various embodiments, brake system test method 200 may be applied to each brake actuator 36 of brake assembly 11 individually. In further embodiments, brake system test method 200 may be applied to more than one, including, for example, all of the brake actuators 36 of a given brake assembly 11, at the same time. For example, brake assembly 11 may comprise more than one, such as, for example, four brake actuators 36. However, the use of any number of brake actuators is within the scope of the present disclosure.

In various embodiments, brake system test method 200 comprises at least partially actuating brake actuator in step 202. For example, step 202 may comprise applying electrical energy to a predetermined brake actuator 36 and electric motor 50 to cause ram 35 to extend towards and apply force to brake stack 27. In various embodiments, a predetermined electrical energy level may be applied to brake actuator 36 that will result in a predetermined force applied by ram 35 against brake stack 27. Further, the predetermined electrical energy level may be applied for a predetermined time period.

Brake system test method 200 may further comprise, for example, discontinuing actuation to the electromechanical actuator in step 204. In various embodiments, after a predetermined time period, the predetermined electrical energy level applied to brake actuator 36 is discontinued.

In various embodiments, brake system test method 200 comprises determining the actuation level of the brake actuator in step 206. Actuation level may be expressed as the position of ram 35. For example, step 206 may comprise determining the position of ram 35 after discontinuing actuation of brake actuator 36. In various embodiments, the position of ram 35 may be determined by a position sensor within brake actuator 36. However, any manner of determining the actuation level of brake actuator 36 is within the scope of the disclosure. In various embodiments, ram 35 may be extended between about 1 and 20 millimeters, or between about 2 and 10 millimeters, or further, between about 4 and 6 millimeters.

Brake system test method 200 may further comprise, for example, evaluating braking performance in step 208. In various embodiments, step 208 comprises comparing the position of ram 35 after discontinuing actuation to a predetermined or expected position. If the position of ram 35 is, for example, further extended from brake actuator 36 than desired, a braking system performance issue may be present. For example, as previously discussed, if ram 35 does not retract to a predetermined position from brake stack 27 after electrical energy is discontinued, brake assembly 11 may experience undesired and/or uncommanded braking. For example, a difference between the predetermined value and the actuation level between about 1 and 10 millimeters may indicate a braking performance issue.

Figure 3:
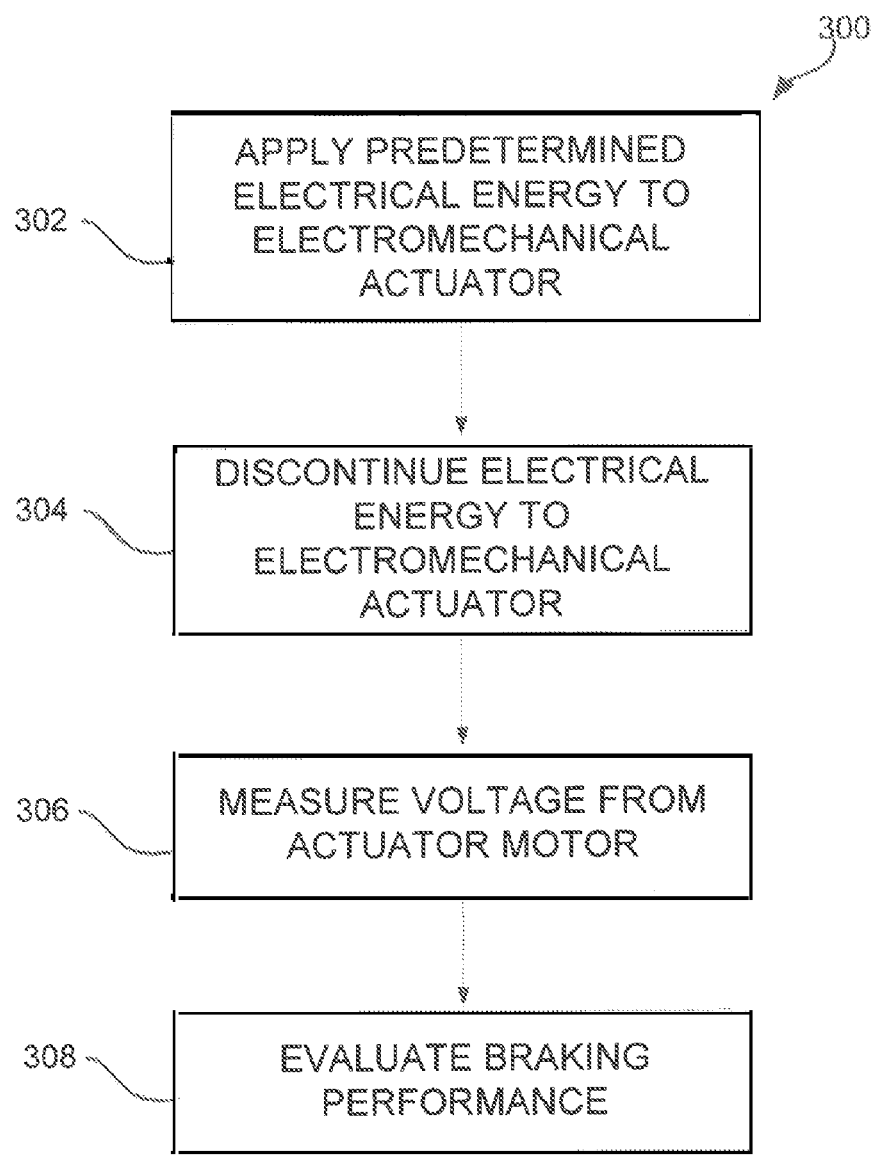
FIG. 3 illustrates a further brake system testing method in accordance with various embodiments.

With reference to FIG. 3, a brake system test method 300 is illustrated. In various embodiments, similarly to method 200, brake system test method 300 may be employed to determine if one or more brake actuators 36 are operating within desired operating parameters and therefore are less likely to cause undesired braking. For example, brake system test method 300 may be applied to an aircraft that is in flight, taxi, park, or on ground in an effort to detect the potential failure of one or more electromechanical actuators 36 before landing.

In various embodiments, brake system test method 300 comprises an applying a predetermined electrical energy level to an electromechanical actuator step 302. Similarly to step 202 of method 200, step 302 may comprise applying electrical energy to a desired electromechanical actuator 36 to cause ram 35 to extend towards and apply force to brake stack 27. In various embodiments, a predetermined electrical energy level may be applied to actuator 36 and electric motor 50 that will result in a predetermined force applied by ram 35 against brake stack 27. Further, the predetermined electrical energy level may be applied for a predetermined time period.

Brake system test method 300 may further comprise, for example, discontinuing electrical energy to the electromechanical actuator step 304. In various embodiments, step 304 comprises discontinuing the predetermined electrical energy level applied to electromechanical actuator 36 after a predetermined period of time.

In various embodiments, brake system test method 300 comprises a measuring voltage from a motor of the electromechanical actuator step 306. For example, if ram 35 remains engaged with and extended towards brake stack 27 after electrical energy is discontinued, electric motor 50 may operate in reverse, generating electrical energy. In various embodiments, step 306 may comprise measuring the electrical voltage produced by electric motor 50 after discontinuing electrical energy to the ram. In other embodiments, step 306 comprises measuring other electrical characteristics of electric motor 50, including, for example, peak power or energy, RMS power or energy, current, or any other electrical characteristic of motor 50.

Brake system test method 300 may further comprise, for example, an evaluating braking performance in step 308. In various embodiments, step 308 comprises comparing the electrical voltage produced by electric motor 50 of electromechanical actuator 36 after discontinuing electrical energy to a predicted or expected position. If the voltage generated by electric motor 50 is, for example, less than an expected value, a braking system performance issue may be present. For example, as previously discussed, if ram 35 does not retract from brake stack 27 after electrical energy is discontinued, brake assembly 11 may experience undesired and/or uncommanded braking. A lower than anticipated voltage produced by electric motor 50 may indicate such undesired and/or uncommanded braking. For example, a difference between an anticipated voltage produced by electric motor 50 and the measured voltage generated by the electric motor 50 may be between about 1 and 1000 volts, or between about 100 and 900 volts, or further, between about 200 and 700 volts.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for testing the operation of an aircraft braking system comprising:
    applying a predetermined electrical energy level to an electromechanical actuator attached to a brake assembly, wherein the brake assembly comprises a brake stack;
    discontinuing electrical energy to the electromechanical actuator;
    after discontinuing electrical energy to the electromechanical actuator, measuring a voltage from a motor of the electromechanical actuator; and
    evaluating braking performance by comparing the voltage from the motor of the electromechanical actuator after discontinuing electrical energy to the electromechanical actuator to a predetermined desired voltage;
    wherein the measuring the voltage from the motor of the electromechanical actuator comprises receiving a voltage signal from the motor of the electromechanical actuator operating as a generator, wherein the a difference between the voltage produced by the motor and the predetermined value between about 1 volts and 1000 volts indicates a braking performance issue.

2. The testing method of claim 1, wherein the braking system comprises four electromechanical actuators.

3. The testing method of claim 2, wherein each of the electromechanical actuators are tested independently from one another.

4. The testing method of claim 2, wherein two or more of the electromechanical actuator are tested simultaneously.

5. The testing method of claim 4, wherein the evaluating the braking performance comprises comparing the voltage produced by the motor of the electromechanical actuator to a predetermined value.

6. The testing method of claim 1, wherein the testing method is performed on an aircraft as it is taxiing or parked.

\* \* \* \* \*